(12) United States Patent
Ozaki et al.

(10) Patent No.: US 7,932,656 B2
(45) Date of Patent: Apr. 26, 2011

(54) MAGNETIC BEARING DEVICE

(75) Inventors: Takayoshi Ozaki, Iwata (JP); Hiroyuki Yamada, Iwata (JP); Kenichi Suzuki, Iwata (JP)

(73) Assignee: NTN Corporation, Osaka (JP)

( * ) Notice: Subject to any disclaimer, the term of this patent is extended or adjusted under 35 U.S.C. 154(b) by 414 days.

(21) Appl. No.: 12/095,919

(22) PCT Filed: Nov. 13, 2006

(86) PCT No.: PCT/JP2006/322559
§ 371 (c)(1),
(2), (4) Date: Jun. 3, 2008

(87) PCT Pub. No.: WO2007/066473
PCT Pub. Date: Jun. 14, 2007

(65) Prior Publication Data
US 2009/0046963 A1 Feb. 19, 2009

(30) Foreign Application Priority Data

Dec. 9, 2005 (JP) .................................. 2005-355754
Dec. 9, 2005 (JP) .................................. 2005-355755
Dec. 9, 2005 (JP) .................................. 2005-355756
Dec. 9, 2005 (JP) .................................. 2005-355757

(51) Int. Cl.
*H02K 7/09* (2006.01)
*F16C 32/04* (2006.01)
(52) U.S. Cl. ...................... 310/90.5; 310/365
(58) Field of Classification Search ................ 310/90.5; 417/365, 407
See application file for complete search history.

(56) References Cited

U.S. PATENT DOCUMENTS

| 5,555,745 A * | 9/1996 | Agahi et al. ..................... 62/401 |
| 5,783,887 A | 7/1998 | Ueyama et al. |
| 5,836,739 A | 11/1998 | Haramura et al. |
| 6,846,167 B2 | 1/2005 | Jaisle |

FOREIGN PATENT DOCUMENTS

GB  2 298 901 A  9/1996
(Continued)

OTHER PUBLICATIONS

Machine Translation of Satoshi et al., JP 2005-240963 Aug. 27, 2010.*
Notification of Transmittal of Translation of the International Preliminary Report on Patentability (Chapter I or Chapter II of the Patent Cooperation Treaty) for International Application No. PCT/JP2006/322559, mailed on Nov. 27, 2008 (6 pages).
(Continued)

*Primary Examiner* — Quyen Leung
*Assistant Examiner* — David W. Scheuermann
(74) *Attorney, Agent, or Firm* — Osha • Liang LLP

(57) ABSTRACT

A magnetic bearing device includes a main shaft (13), a flange shaped thrust plate (13a) coaxially mounted on the main shaft so as to extend perpendicular to the main shaft and made of a ferromagnetic material, a rolling bearing unit for supporting a radial load and a magnetic bearing unit for supporting one or both of an axial load and a bearing preload, an electromagnet (17) fitted to a spindle housing (14) so as to confront the thrust plate, without contact, a sensor (18) for detecting an axial force acting on the main shaft, and a controller (19) for controlling the electromagnet in response to an output from the sensor. In this magnetic bearing device, the stiffness of a composite spring formed by the rolling bearing unit and a support system for the rolling bearing unit is so chosen as to be higher than the negative stiffness of the electromagnet.

5 Claims, 9 Drawing Sheets

FOREIGN PATENT DOCUMENTS

| | | |
|---|---|---|
| JP | 60-26817 | 2/1985 |
| JP | 6-43347 | 6/1994 |
| JP | 7-91760 | 4/1995 |
| JP | 8-261237 A | 10/1996 |
| JP | 2623202 | 4/1997 |
| JP | 11-503223 A | 3/1999 |
| JP | 2002-95209 | 3/2002 |
| JP | 2003-65621 A | 3/2003 |
| JP | 2005-240963 | 9/2005 |
| WO | 96/31744 | 10/1996 |

OTHER PUBLICATIONS

Chinese Office Action for Application No. 200680046040.3, mailed on Nov. 13, 2009 (5 pages).
International Search Report with English Translation from PCT/JP2006/322560 dated Jan. 9, 2007 (5 pages).
Notice of Allowance for U.S. Appl. No. 12/095,933, mailed on Feb. 1, 2010 (7 pages).
International Search Report with English Translation from PCT/JP2006/322559 dated Jan. 9, 2007 (4 pages).
Patent Abstract of Japan; Publication No. 08-261237 dated Oct. 8, 1996 (1 page).
Patent Abstracts of Japan; Publication No. 2003-065621 dated Mar. 5, 2003 (1 page).
Patent Abstracts of Japan; Publication No. 2005-240963 dated Sep. 8, 2005 (1 page).
Patent Abstracts of Japan; Publication No. 60-026817 dated Feb. 9, 1985 (1 page).
Patent Abstracts of Japan; Publication No. 06-207755 dated Jul. 26, 1994 (1 page).
Patent Abstracts of Japan; Publication No. 07-091760 dated Apr. 4, 1995 (1 page).
Patent Abstracts of Japan for Japanese Publication No. 2002-095209, Publication date Mar. 29, 2002 (1 page).

* cited by examiner

MAGNETIC BEARING DEVICE

BACKGROUND OF THE INVENTION

The present invention relates to a magnetic bearing device concurrently utilizing a rolling bearing unit and a magnetic bearing unit and utilizable in, for example, a turbine unit in an air cycle refrigerating system, in which the magnetic bearing device is operable to support one or both of an axial load and a bearing preload.

The air cycle refrigerating system makes use of an air as a refrigerating medium and does therefore fail to exhibit a sufficient energy efficiency as compared with the refrigerating system using chlorofluorocarbon or ammonium, but is considered agreeable in terms of environmental protection. Also, in a facility such as, for example, a cold storage warehouse into which a refrigerating air can be directly blown, the total cost can be lowered if a cooling fan device and/or defroster are dispensed with, and, accordingly, the use of the air cycle refrigerating system in such application has been suggested. (See, for example, the Japanese Patent No. 2623202.)

Also, it is well known that in a deeply cold range of −30 to −60° C., the theoretical efficiency of air refrigeration is equal to or higher than that of chlorofluorocarbon or ammonium. It is, however, said that optimally designed peripheral equipments are needed in order to secure the theoretical efficiency of the air refrigeration. Those peripheral equipments include, for example, compressors and/or expansion turbines.

For the compressor and expansion turbine, a turbine unit, in which a compressor rotor and an expansion turbine rotor are mounted on a common main shaft, is generally utilized. (See, for example, the Japanese Patent No. 2623202.)

It is to be noted that for the turbine unit used to handle a process gas, a magnetic bearing type turbine unit has been suggested, in which the turbine rotor and the compressor rotor are respectively mounted on respective opposite ends of the main shaft, which is supported by a thrust bearing and a journal that can be controlled by an electric current flowing through an electromagnet. (See, for example, the Japanese Laid-open Patent Publication No. 07-91760.)

Also, although related to a suggestion concerning a gas turbine engine, the use of a thrust magnetic bearing device has been made to reduce the thrust load, acting on the rolling bearing device for the support of a main shaft, in order to avoid the possibility that the thrust load would lead to reduction in bearing lifetime. (See, for example, the Japanese Laid-open Patent Publication No. 08-261237.)

As discussed above, in order to secure the theoretical efficiency of the air cooling, at which a high efficiency can be obtained in the deeply cold range, the air cycle refrigerating system requires the use of a compressor and/or an expansion turbine that are optimally designed.

For the compressor and the expansion turbine, as mentioned above the turbine unit including the compressor rotor and the expansion turbine rotor both mounted on a common main shaft is utilized. This turbine unit increases the efficiency of the air cycle refrigerator in view of the fact that the compressor rotor is driven by a power induced by the expansion turbine.

However, in order to secure a practically acceptable efficiency, a clearance delimited between each of the rotors and a housing must necessarily be small. Change in clearance constitutes a cause of an unstable operation during high speed rotation and, therefore, the efficiency tends to be lowered.

Also, by the effect of an air acting on the compressor rotor and the turbine rotor, the thrust force acts on the main shaft and the bearing unit supporting the main shaft is loaded with the thrust load. The rotational speed of the main shaft in the turbine unit employed in the air cycle refrigerating system is 80,000 to 100,000 revolutions per minute, which is considerably high as compared with that in the bearing unit for the standard application. For this reason, the thrust load such as described above tends to bring about a reduction in long-term durability and lifetime of the bearing unit used to support the main shaft and, in turn, a reduction in reliability of the air cycle refrigerating turbine unit. Unless the problem associated with the long-term durability of the bearing unit is resolved, the air cycle refrigerating turbine unit can be hardly placed in practical use. However, the technology disclosed in the Japanese Patent No. 2623202 has not yet resolved the problem associated with the reduction in long-term durability of the bearing unit relative to the loading of the thrust load under such a high speed revolution.

In the case of the turbine compressor of a magnetic bearing type such as disclosed in the Japanese Laid-open Patent Publication No. 07-91760, in which the main shaft is supported by the journal bearing unit in the form of a magnetic bearing and the thrust bearing unit, the journal bearing unit lacks a function of supporting in the axial direction. For this reason, the presence of a factor or the like that render the control of the thrust bearing unit to be unstable makes it difficult to achieve a stabilized high speed revolution while the minute clearance is maintained between the rotor and the diffuser. The magnetic bearing unit involves a problem associated with a contact between the rotor and the diffuser at the time of failure of the electric power supply.

Where arrangement is made that the rolling bearing unit and the magnetic bearing unit are concurrently used to support the main shaft, and the rolling bearing unit is operable to support the radial load whereas the magnetic bearing unit is operable to support one or both of the axial load and the bearing preload, the main shaft can be supported in the axial direction and there is no problem associated with the contact at the time of failure of the electric power supply such as occurring in the magnetic bearing unit. In the case of this construction, the electromagnet of the magnetic bearing unit is provided so as to confront, without contact, the flange shaped thrust plate coaxially-mounted on the main shaft so as to extend perpendicular thereto and made of the ferromagnetic material, and the electromagnet is controlled by the controller in response to the output from the sensor for detecting the force in the axial direction.

When the main shaft of the rotor is supported by the rolling bearing unit, the position of the main shaft can be regulated in the axial direction by the regulating function of the rolling bearing unit and the clearance between the rotors and the housing can be maintained at a constant value. In the case of the rolling bearing unit having the function of regulating the position in the axial direction as discussed above, reduction in long term durability due to the thrust force in the bearing unit then revolving at high speed poses a problem, but since the thrust force is supported by the electromagnet, the long term durability of the rolling bearing can be secured.

However, in the magnetic bearing device, in which the rolling bearing unit and the magnetic bearing unit are used concurrently, in the event that an excessive axial load acts, the negative stiffness of the electromagnet (which acts in a direction of displacement and as the displacement increases, the force thereof increases correspondingly) comes to be large. When the negative stiffness of the electromagnet comes to be higher than the stiffness of the composite spring formed by the rolling bearing unit and the support system of the rolling bearing unit, the control system of the magnetic bearing device becomes unstable. In order to avoid such condition, there is a need to add a phase compensating circuit to the controller beforehand, resulting in a problem that the controller tends to be complicated in structure.

SUMMARY OF THE INVENTION

An object of the present invention is to provide a magnetic bearing device, in which a rolling bearing unit and a magnetic bearing unit are concurrently utilized, in which device a stable control is possible and a controller used therein can be simplified in structure.

The magnetic bearing device according to a first construction of the present invention includes a main shaft, a flange shaped thrust plate coaxially mounted on the main shaft so as to extend perpendicular to the main shaft and made of a ferromagnetic material, a rolling bearing unit for supporting a radial load and a magnetic bearing unit for supporting one or both of an axial load and a bearing preload, an electromagnet fitted to a spindle housing so as to confront the thrust plate, on a non-contact basis, a sensor for detecting an axial force acting on the main shaft, and a controller for controlling the electromagnet in response to an output from the sensor. In this magnetic bearing device, the stiffness of a composite spring formed by the rolling bearing unit and a support system for the rolling bearing unit is so chosen as to be higher than the negative stiffness of the electromagnet.

Since the magnetic bearing device according to this first construction is of a design in which the rolling bearing unit for supporting a radial load and the magnetic bearing unit for supporting one or both of an axial load and a bearing preload are used concurrently, a highly precise support in the axial direction can be accomplished, the long term durability of the rolling bearing unit can be secured, and any damage at the time of a failure of the electric power supply such as occurring when the support is made only with the magnetic bearing unit can be avoided.

Also, since the stiffness of the composite spring formed by the rolling bearing unit and the support system for the rolling bearing unit is so chosen to be higher than the negative stiffness of the electromagnet, it is possible to prevent the phase of a mechanical system from being retarded 180° in a control region. For this reason, it is possible to stabilize a target to be controlled by the controller and accordingly, even when the controller have a circuit configured simply by utilizing proportional control or proportional-integral control, stable control can be attained.

The magnetic bearing device according to the first construction may have an electromagnet gap which satisfies the following formula:

$$d > k \times Fmax/Kbrg,$$

wherein Kbrg represents the stiffness of the composite spring formed by the rolling bearing unit and the support system for the rolling bearing unit, Fmax represents a maximum load, d represents an electromagnet gap and k represents a proportional constant. This magnetic bearing device is rendered to be a magnetic bearing device according to a second construction.

Since the magnetic bearing device according to the second construction described above is of a design in which the electromagnet gap is so set as to satisfy the foregoing conditional formula, it is possible to maintain the relation, in which the stiffness of the composite spring formed by the rolling bearing unit and the support system for the rolling bearing unit is higher than the negative stiffness of the electromagnet, even under the condition of the bearing preload with the suitable light load in the high speed region, by means of the electromagnet gap increased in size. As a result thereof, it is possible to prevent the phase of a mechanical system from being retarded 180° in a control region. For this reason, it is possible to stabilize a target to be controlled by the controller, even when a maximum load acts, and the controller can have a circuit configured simply by utilizing proportional control or proportional-integral control.

The magnetic bearing device according to the first construction may include a permanent magnet arranged within a yoke of the electromagnet. This is rendered to be a magnetic bearing device according to a third construction.

With the magnetic bearing device according to the third construction described above, while, under the condition of the bearing preload with the suitable light load in the high speed region, it is necessary to reduce the negative stiffness of the electromagnet in order to maintain the above-mentioned relation in magnitude between the stiffness of the composite spring and the negative stiffness of the electromagnet, positioning of the permanent magnet within the yoke of the electromagnet is effective to increase the electromagnet gap and, accordingly, the negative stiffness of the electromagnet can be reduced.

Also, even under the condition of the maximum axial load, positioning of the permanent magnet within the yoke of the electromagnet is effective to reduce the amount of the electric power consumed by the electromagnet and, hence, to reduce the heat evolution of the electromagnet.

In the magnetic bearing device according to the first construction, the permanent magnet may be arranged within the yoke of the electromagnet on one side of the thrust plate, and another electromagnet including no permanent magnet may be arranged within the yoke on the other side of the thrust plate so as to confront the electromagnet on the one side, and in a light load region of the axial load, both of the electromagnets concurrently operate. This is rendered to be a magnetic bearing device according to a fourth construction.

With the magnetic bearing device according to the fourth construction described above, since at the light load region of the axial load, the electromagnet including the permanent magnet arranged within the yoke thereof and the electromagnet including no permanent magnet and arranged in face-to-face relation with the electromagnet referred to above are used concurrently, the amount of the electric power consumed by the electromagnet can be most reduced within the operating range, in which the axial load acts. In other words, where the permanent magnet is arranged in both of the electromagnets opposed to each other, the amount of the electric power consumed by the electromagnet increases, accompanied by a heat evolution in order to reduce the magnetic force of attraction of the permanent magnet in the light load region of the axial load, but the fourth construction can eliminate such problem.

In the magnetic bearing device according to the fourth construction, the electromagnet having the permanent magnet, may be arranged on one side for supporting an excessive axial load and the electromagnet including no permanent magnet may be arranged so as to confront the electromagnet having the permanent magnet, while sandwiching the thrust plate therebetween. This is rendered to be a magnetic bearing device according to a fifth construction.

The magnetic bearing device according to the first construction may be applied to support the main shaft in a compressive expansion turbine system which comprises a compressor rotor and a turbine rotor both mounted on a common main shaft having the thrust plate, in which case the compressor rotor being driven by a power generated by the turbine rotor. This is rendered to be a magnetic bearing device according to a sixth construction.

In the case of the sixth construction, such advantages that a stabilized control is possible in the magnetic bearing device of the present invention and that the controller can have a simplified construction can be exhibited effectively, and a stabilized high speed revolution of the main shaft can be obtained with the proper rotor tip clearance maintained. Also, the long term durability of the bearing can be increased.

The magnetic bearing device according to the first construction may be of a type, in which the compressive expansion turbine system, to which the magnetic bearing device is applied, is applied to an air cycle refrigerating system in which an intake air is subjected sequentially to compression by means of a pre-compressing unit, cooling by means of a heat exchanger, compression by means of a compressor including the compressor rotor in a turbine unit, cooling by means of another heat exchanger, and adiabatic expansion by means of an expansion turbine including the turbine rotor in the turbine unit. This is rendered to be a magnetic bearing device according to a seventh construction.

Where the compressive expansion turbine system, to which the magnetic bearing device is applied, is applied to the air cycle refrigerating system of the kind referred to the seventh construction, in the compressive expansion turbine system, the stabilized high speed revolution of the main shaft can be obtained with the proper rotor tip clearance maintained and, also, the long term durability of the bearing can be increased. Accordingly, the reliability of the compressive expansion turbine system as a whole and, hence, that of the air cycle refrigerating system as a whole can be increased. Also, since the stabilized high speed revolution, the long-term durability and the reliability of the main shaft bearing units of the compressive turbine unit, which have hitherto been a major bottleneck to the air cycle refrigerating system, can be increased, the air cycle refrigerating system has now come to be employed practically.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF THE PREFERRED EMBODIMENTS

Figure 1:
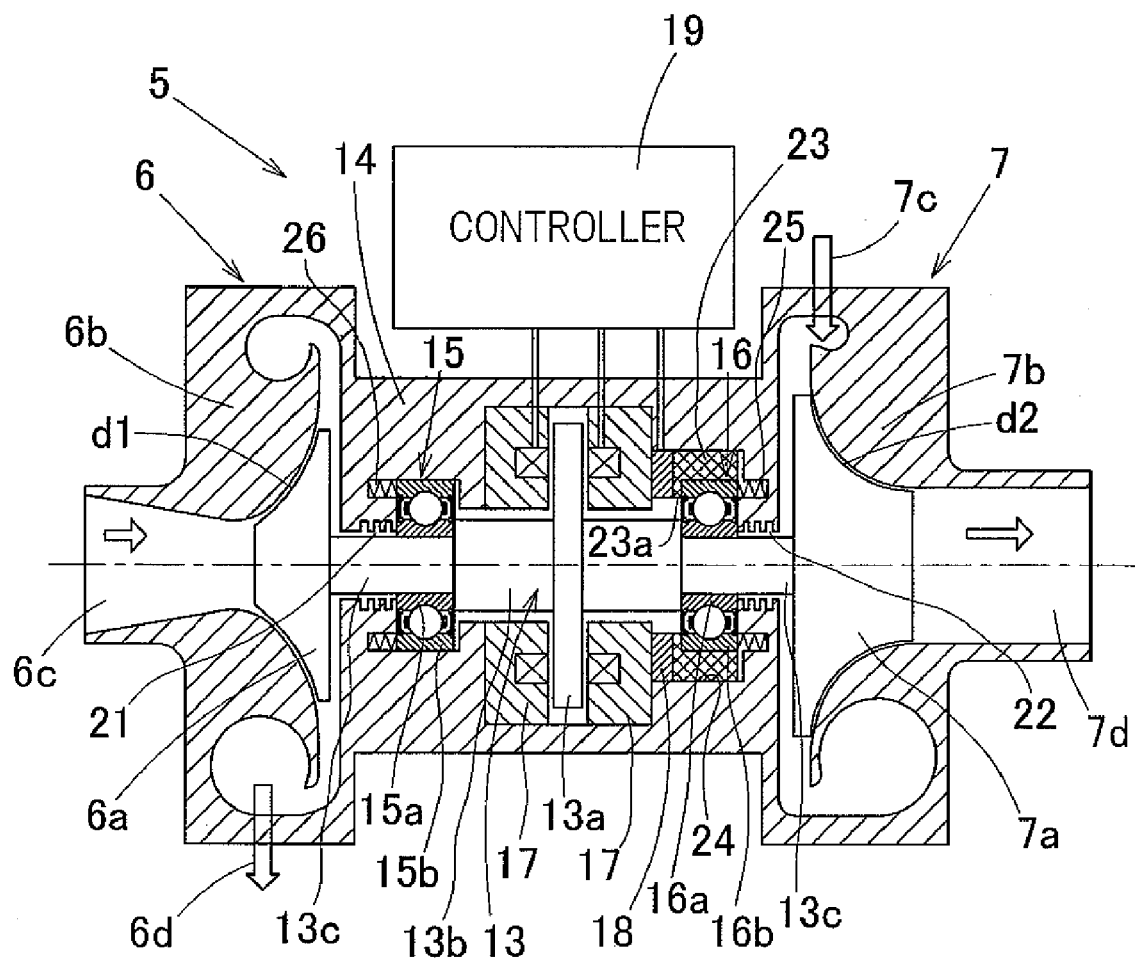
FIG. 1 is a sectional view of a turbine unit incorporating a magnetic bearing device according to a first preferred embodiment of the present invention.

The first preferred embodiment of the present invention will be described with particular reference to FIGS. 1 and 2. FIG. 1 illustrates a sectional view showing a turbine unit 5, which incorporates therein a magnetic bearing device according to the first embodiment of the present invention. This turbine unit 5 forms a part of a compressive expansion turbine system and includes a compressor 6 and an expansion turbine 7, and a compressor rotor 6a of the compressor 6 and an turbine rotor 7a of the expansion turbine 7 are mounted on opposite ends of a main shaft 13, respectively. Also, the compressor rotor 6a referred to above is driven by a power induced by the turbine rotor 7a and, accordingly, no extra drive source is employed.

The compressor 6 includes a housing 6b opposed to the compressor rotor 6a with a minute clearance d1 intervening therebetween and is operable to compress an air, sucked axially from a suction port 6c at a center portion thereof by means of the compressor rotor 6a and then to discharge the air from an exit port (not shown) on an outer peripheral portion thereof in a direction shown by the arrow 6d.

The expansion turbine 7 includes a turbine housing 7b opposed to the turbine rotor 7a with a minute clearance d2 intervening therebetween and is operable to adiabatically expand an air, sucked from an outer peripheral portion in a direction shown by the arrow 7c, by means of the turbine rotor 7a and then to discharge the air from a discharge port 7d at a center portion thereof in a direction axially thereof.

A magnetic bearing device employed in this turbine unit 5 includes a plurality of, for example, two, bearing units 15 and 16, which support the main shaft 13 in a radial direction, and electromagnets 17 forming respective parts of a magnetic bearing unit and operable to support a thrust force acting on the main shaft 13. This turbine unit 5 includes sensors 18 for detecting a thrust force, brought about by the air within the compressor 6 and the expansion turbine 7 and acting on the main shaft 13, and a controller 19 for controlling the supporting force, exerted by the electromagnets 17, in response to an output from each of the sensors 18. A flange shaped thrust plate 13a made of a ferromagnetic material is coaxially mounted on an axially intermediate portion of the main shaft 13 so as to lie perpendicular to the main shaft 13. The electromagnets 17 are mounted on a spindle housing 14 so as to confront, on a non-contact basis, respective opposite surfaces of the thrust plate 13a.

Each of the bearing units 15 and 16 for supporting the main shaft 13 is in the form of a rolling bearing device and has a function of regulating the position in the axial direction and may be specifically employed in the form of, for example, a deep groove ball bearing or an angular contact ball bearing. In the case of the deep groove ball bearing, it has a thrust supporting function in both direction and has a capability of returning the axial position of inner and outer rings back to a neutral position. Those two bearing units 15 and 16 are arranged in proximity to the compressor rotor 6a and the turbine rotor 7a, respectively.

The main shaft 13 is of a stepped configuration made up of a large diameter portion 13b at an intermediate portion thereof and reduced diameter portions 13c at respective opposite ends thereof. Each of the bearing units 15 and 16 on respective sides includes an inner ring 15a and 16a mounted on the respective reduced diameter portion 13c in a press-fitted fashion with one end face thereof engaged with a stepped face delimited between the large diameter portion 13b and the reduced diameter portion 13c.

Respective portions of the spindle housing 14 adjacent the rotors 6a and 7a are so formed that inner diametric surfaces thereof may have a diameter proximate to that of the main shaft 13, and corresponding non-contact sealing members 21 and 22 are formed in those inner diametric surfaces. Although in the embodiment as shown, each of the non-contact sealing members 21 and 22 is employed in the form of a labyrinth seal defined by a plurality of circumferentially extending grooves formed in the inner diametric surface of the spindle housing 14 and juxtaposed in a direction axially thereof, any other non-contact sealing member may be employed in place of such labyrinth seal.

The sensors 18 referred to above are arranged on a stationary side of the bearing unit 16 adjacent the turbine rotor 7a, that is, the spindle housing 14. A bearing housing 23 formed in a ring shape is axially slidably mounted on an inner diametric surface 24 provided in the spindle housing 14. The bearing unit 16 having the sensors 18 positioned in proximity thereto has an outer ring 16b fixedly mounted within the bearing housing 23. The bearing housing 23 has an inner collar 23a formed at one end thereof for engagement with an end face of the outer ring 16b of such bearing unit 16. The inner collar 23a is provided at the one end axially inwardly of the bearing housing 23.

The sensors 18 are distributed to a plurality of, (for example, two) locations spaced from each other in a circumferential direction around the main shaft 13 and are interposed between one of opposite end faces of the bearing housing 23 adjacent the inner collar 23a and one of the electromagnets 17 fixed to the spindle housing 14. Also, the sensors 18 are applied a preloading from a sensor preload spring 25. The sensor preload spring 25 is accommodated within an accommodating recess defined in the spindle housing 14 so as to urge the outer ring 16b of the bearing unit 16 in the axial direction, applying the preload to the sensors 18 through the outer ring 16b and the bearing housing 23. This sensor preload spring 25 may be employed in the form of, for example, a coil spring provided at a plurality of circumferential locations around the main shaft 13.

Preloading by means of the sensor preload spring 25 is for the purpose that the sensors 18 for detecting a thrust force by means of a pressing force can detect a movement of the main shaft 13 in any one of axial directions opposite to each other, and is so chosen as to be a value higher than an average thrust force which acts on the main shaft 13 during a normal operation of the turbine unit 5.

The bearing unit 15 on the other side, where no sensor 18 is disposed, is axially movably supported relative to the spindle housing 14 and is elastically supported by a bearing preload spring 26. In the illustrated instance, an outer ring 15b of the bearing unit 15 is axially movably mounted on an inner diametric surface of the spindle housing 14 and the bearing preload spring 26 is interposed between the outer ring 15b and the spindle housing 14. The bearing preload spring 26 is opposed to a stepped face in the main shaft 13, with which an end face of an inner ring 15a of the bearing unit 15 is engaged, to urge the outer ring 15b, thereby applying a preload to the bearing unit 15. The bearing preload spring 26 is employed in the form of a coil spring or the like provided at a plurality of circumferential locations around the main shaft 13 and is accommodated within an accommodating recess defined in the spindle housing 14. This bearing preload spring 26 has a spring constant so chosen as to be smaller than that of the sensor preload spring 25.

The dynamic model of the magnetic bearing device employed in the turbine unit 5 of the structure discussed above can be constructed with a simple spring system. In other words, this spring system is of a system, in which a composite spring, constituted by the bearing units 15 and 16 and respective support systems (including the sensor preload spring 25, the bearing preload spring 26, the bearing housing 23 and others) therefor and respective springs of the electromagnets 17 are juxtaposed relative to each other. In this spring system, the composite spring constituted by the bearing units 15 and 16 and the support systems of those bearing units provides a stiffness which acts in proportion to the amount of displacement in a direction reverse to the direction in which the displacement takes place, whereas the springs of the electromagnets 17 provides a negative stiffness which acts in proportion to the amount of displacement in the direction in which the displacement takes place.

For this reason, if the relation in magnitude of the stiffness between the composite spring and the springs of the electromagnets is assumed as expressed by the formula (1) below, the phase of the mechanical system will be retarded 180° and, hence, the system comes to be unstable. Therefore, the controller 19 for controlling the electromagnets 17 necessarily requires a phase compensating circuit to be added thereto beforehand, rendering the controller 19 to be complicated in structure.

Stiffness of Composite Spring<Negative Stiffness of Electromagnets (1)

In view of the above, in the magnetic bearing device according to the embodiment now under discussion, the relation in magnitude between the stiffness of the composite spring and that of the springs of the electromagnets is assumed as expressed by the formula (2) below.

Stiffness of Composite Spring>Negative Stiffness of Electromagnets (2)

As described hereinabove, by setting the relation in magnitude of the stiffness between the composite spring and the electromagnet, it is possible to prevent the phase of a mechanical system from being retarded 180° in a control region. For this reason, it is possible to stabilize a target to be controlled by the controller 18 and the controller 19 can have a circuit configured simply by utilizing proportional control or proportional-integral control, as shown in FIG. 2.

Figure 2:
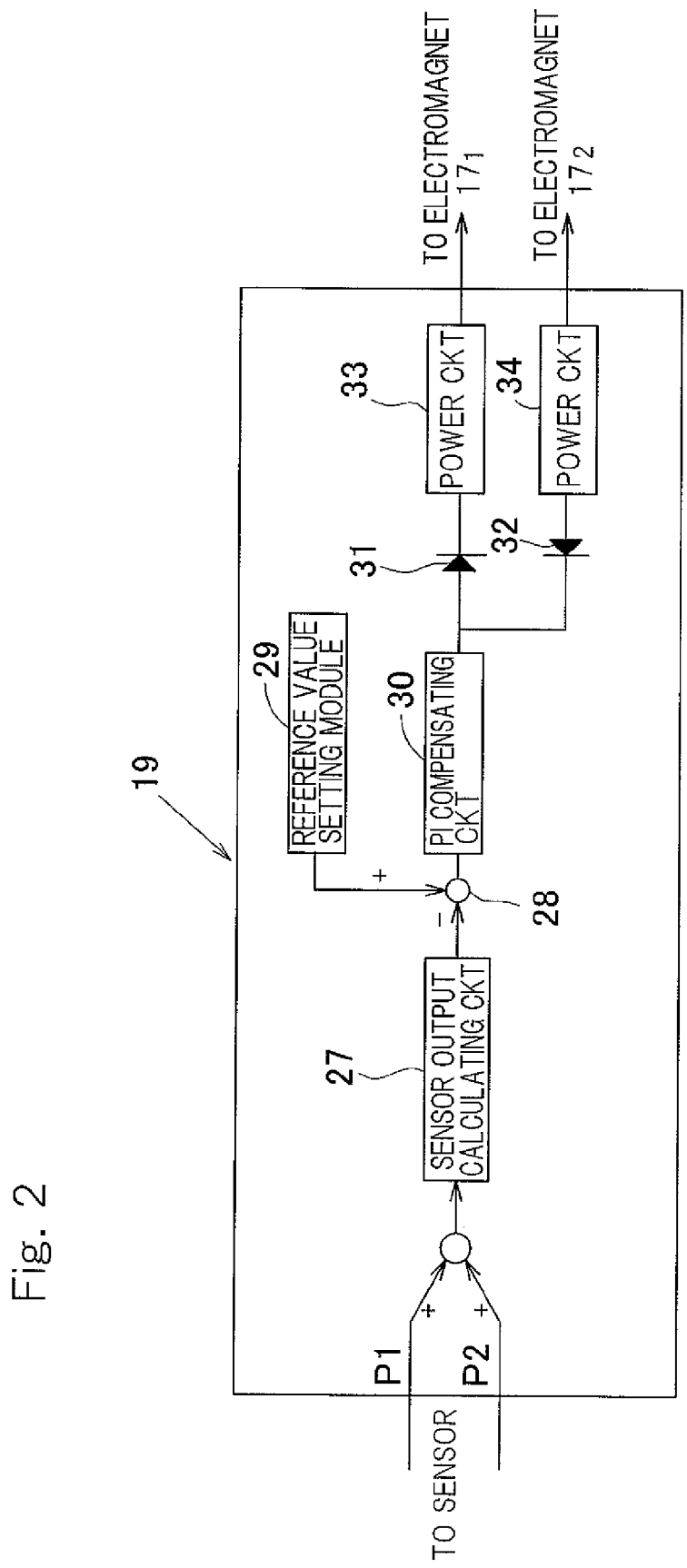
FIG. 2 is a circuit block diagram showing one example of a controller utilized in the turbine unit shown in FIG. 1.

In the controller 19 shown in a circuit block diagram in FIG. 2, each of detection outputs P1 and P2 from the sensors 18 are adjusted (subtracted or summed) by a sensor output calculating circuit 27; a result of calculation so obtained is compared by a comparator 28 with a target value, fed from a reference value setting module 29, to calculate a deviation, and the deviation so calculated is finally subjected to proportional-integral control (or proportional control) that is suitably set by a PI compensating circuit (or a P compensating circuit) 30 according to the turbine unit 5, whereby control signals to be applied to the electromagnets 17 can be calculated. An output from the PI compensating circuit (or the P compensating circuit) is supplied through diodes 31 and 32 to power circuits 33 and 34 for driving the electromagnets $17_1$ and $17_2$ in respective directions. The electromagnets $17_1$ and $17_2$ correspond respectively to the electromagnets 17 opposed to the thrust plate 13a shown in FIG. 1 and since no magnetic force of attraction acts, respective directions of flow of electric currents are determined beforehand by the diodes 31 and 32 so that the electromagnets $17_1$ and $17_2$ can be selectively driven.

As hereinabove described, in the magnetic bearing device according to the first embodiment of the present invention, which is applied to the turbine unit 5, since the relation in magnitude between the negative stiffness of the electromagnets 17 and the composite spring is so set as shown by the formula (2) above, the target to be controlled by the controller 19 can be rendered to be a stable construction and the controller 19 can have a circuit configured simply by utilizing proportional control or proportional-integral control.

Figure 3:
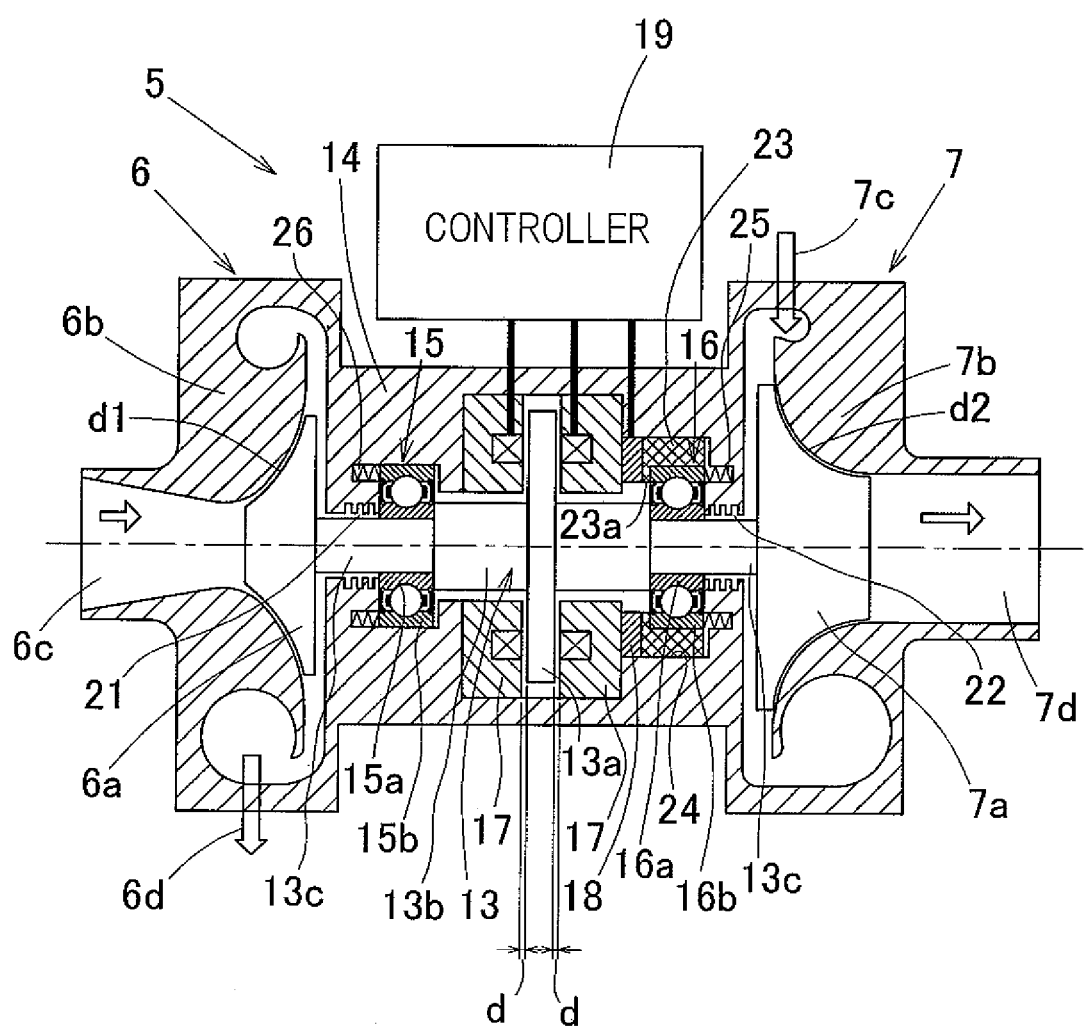
FIG. 3 is a sectional view of the turbine unit incorporating therein the magnetic bearing device according to a second preferred embodiment of the present invention.

A second preferred embodiment of the present invention will now be described with particular reference to FIG. 3 together with FIG. 2 employed in describing the first embodiment of the present invention. FIG. 3 illustrates a sectional view of the turbine unit 5 incorporating therein the magnetic bearing device according to this second embodiment. In this embodiment, component parts shown in and described in connection with the second embodiment, which are similar to those shown in and described in connection with the first embodiment, are designated by like reference numerals employed in FIG. 2 and, therefore, the details thereof are not reiterated for the sake of brevity.

The turbine unit incorporating therein the magnetic bearing device according to this second embodiment is identical in structure with that shown in and described in connection with to the first embodiment, but differs therefrom in that, as will be described in detail subsequently, electromagnet gaps are employed.

Accordingly, the magnetic bearing device according to the second embodiment satisfies the formula (2) as discussed above in connection with the relation in magnitude of the stiffness between the composite spring and the springs of the electromagnet, in a manner similar to that exhibited by the magnetic bearing device according to the first embodiment.

On the other hand, in the magnetic bearing device of the structure described hereinbefore, in a high speed region of revolutions (80,000 to 100,000 rpm) the bearing preloads applied to the bearing units 15 and 16 from the sensor preload 25 and the bearing preload spring 26, respectively, are preferred to be low. But, when the bearing preload is low, the axial stiffness of each of the bearing units 15 and 16 will be lowered, accompanied by lowering of the stiffness of the composite spring defined by the bearing units 15 and 16 and the support system for those bearing units 15 and 16. As a result thereof, in the even that an excessive axial load acts, in order to maintain the relation in magnitude between the stiffness of the composite spring and the negative stiffness of the springs of the electromagnets 17 expressed by the formula (2) above, it is necessary for the negative stiffness of the electromagnets 17 to be low. Also, in order to reduce the negative stiffness of the electromagnets 17, the electromagnet gaps must be increased in size.

The negative stiffness Kns of the electromagnets 17 can be expressed by the following formula (3) when the stiffness of the composite spring is expressed by Kbrg, the maximum load is expressed by Fmax, the electromagnet gaps are each expressed by d and the proportional constant is expressed by k:

$$Kns = k \times Fmax/d \qquad (3)$$

and, hence, the relation in magnitude expressed in the formula (2) can be rewritten as follows:

$$Kbrg > Kns \qquad (4)$$

In view of the above, in the magnetic bearing device according to the second embodiment, in order to maintain the relation in magnitude as expressed by the formula (2) above, it is clear from the relationship between the formulas (3) and (4) that the electromagnet gaps d have to be so chosen as to satisfy the following formula (5):

$$d > k \times Fmax/Kbrg \qquad (5)$$

As discussed above, when the electromagnet gaps d are so chosen as to satisfy the condition expressed by the formula (5) above, it is possible to satisfy the relation in magnitude expressed by the formula (2) above as even under the condition, in which the bearing preload is so low as to suit in the region of high speed revolutions. As a result thereof, in the control region, it is possible to avoid the phase of the mechanical system from being retarded 180° and, accordingly, even when the maximum load acts, the target to be controlled by the controller 19 can be stabilized and controller 19 can have a circuit configured simply by utilizing proportional control or proportional-integral control, as shown in FIG. 2 in connection with the first embodiment. It is to be pointed out that the controller 19 has a circuit configuration identical with that employed in the first embodiment and, therefore, the details thereof are not reiterated for the sake of brevity.

As hereinabove described, in the magnetic bearing device according to the second embodiment which has been applied to the turbine unit 5, since the relation in magnitude of the stiffness between the composite spring and the electromagnet springs is so chosen as to satisfy the formula (2), which has been described in connection with the first embodiment, and the electromagnet gaps d are so chosen as to satisfy the conditional formula (5), the target to be controlled by the controller 19 can have a stabilized construction, even when the maximum load acts, and the controller 19 can have a circuit configured simply by utilizing proportional control or proportional-integral control.

Figure 4:
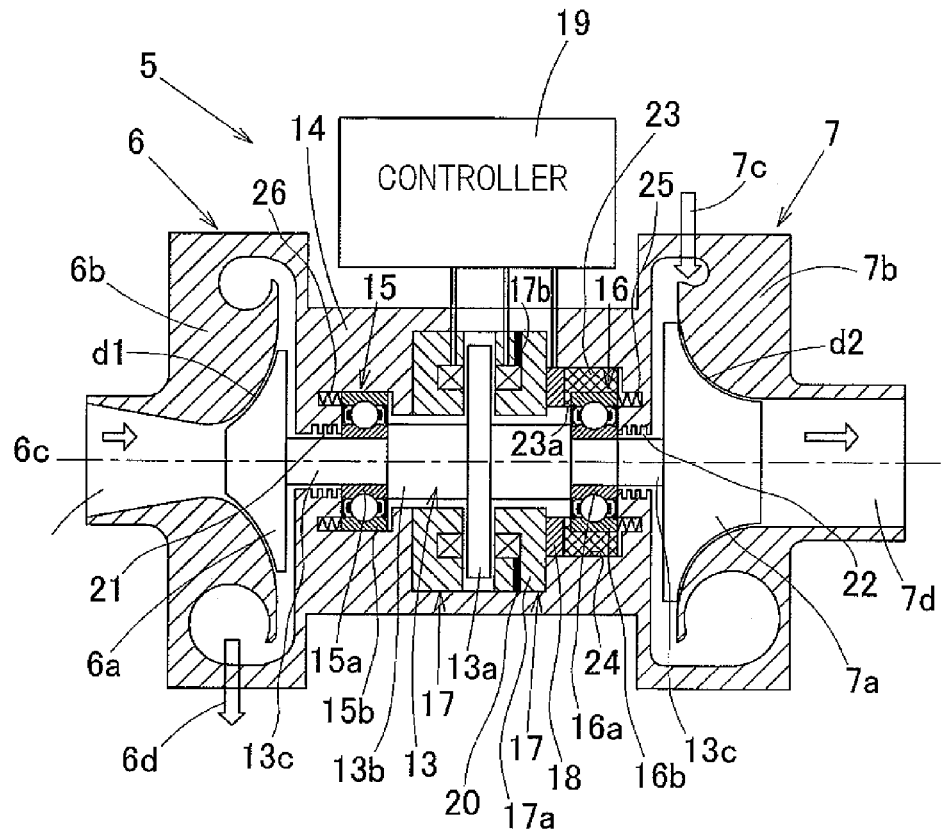
FIG. 4 is a sectional view of the turbine unit incorporating therein the magnetic bearing device according to a third preferred embodiment of the present invention.

A third preferred embodiment of the present invention will be described with particular reference to FIGS. 4 to 6 together with FIG. 2 employed in describing the first embodiment of the present invention. FIG. 4 illustrates a sectional view of the turbine unit 5 incorporating therein the magnetic bearing device according to this third embodiment. In this embodiment, component parts shown in and described in connection with the third embodiment, which are similar to those shown in and described in connection with the first embodiment, are designated by like reference numerals employed in FIG. 2 and, therefore, the details thereof are not reiterated for the sake of brevity.

The turbine unit incorporating therein the magnetic bearing device according to this third embodiment differs from that in the first embodiment in that, as will be described in detail subsequently, the electromagnet has a permanent magnet built therein.

Accordingly, even the magnetic bearing device according to this third embodiment satisfies the formula (2) discussed above, in connection with the relation in magnitude of the stiffness between the composite spring and the springs of the electromagnet, in a manner similar to that exhibited by the magnetic bearing device according to the first embodiment.

On the other hand, in the magnetic bearing device of the structure described hereinbefore, in a high speed region of revolutions (80,000 to 100,000 rpm) the bearing preloads applied to the bearing units 15 and 16 from the sensor preload 25 and the bearing preload spring 26, respectively, are preferred to be low. But, when the bearing preload is low, the axial stiffness of each of the bearing units 15 and 16 will be lowered, accompanied by lowering of the stiffness of the composite spring defined by the bearing units 15 and 16 and the support system for those bearing units 15 and 16. As a result thereof, in the even that an excessive axial load acts, in order to maintain the relation in magnitude between the stiffness of the composite spring and the negative stiffness of the springs of the electromagnets 17 expressed by the formula (2) above, it is necessary for the negative stiffness of the electromagnets 17 to be low. Also, in order to reduce the negative stiffness of the electromagnets 17, the electromagnet gaps must be increased in size.

Figure 5A:
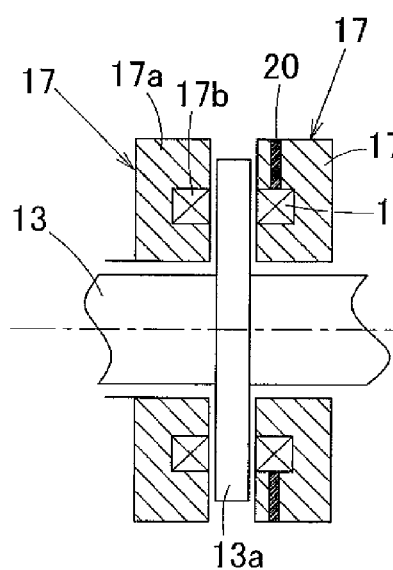
FIG. 5A is an enlarged sectional view showing a different electromagnet used in the magnetic bearing device according to the third embodiment of the present invention.
Figure 5B:
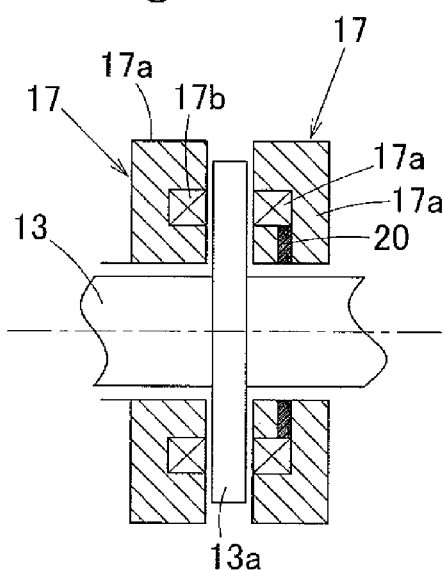
FIG. 5B is an enlarged sectional view showing a further different electromagnet.

In view of the above, in the magnetic bearing device according to this third embodiment in order to maintain the relation in magnitude expressed by the formula (2) above, one of the electromagnets 17 sandwiching the thrust plate 13a therebetween, which is positioned in proximity to the sensors 18, has a yoke 17a in which a permanent magnet 20 is arranged so that the electromagnet gap may be increased in size. Although both of the electromagnets 17 may have a respective permanent magnet 20 built therein, the use of the permanent 20 in only one of the electromagnets 17 such as in this third embodiment is preferred. In FIG. 4, in order to reduce leakage magnetic fluxes from the permanent magnet 20, the permanent magnet 20 of a ring shape coaxial with the main shaft 13 is arranged within the yoke 17a on an outer diametric side of a coil 17b of the electromagnet 17. But, as shown in FIG. 5B, even when the permanent magnet 20 is arranged within the yoke 17a on an inner diametric side of the coil 17b of the electromagnet 17, the leakage magnetic fluxes from the permanent magnet 20 can be reduced. Also, although in FIG. 4, the permanent magnet 20 is arranged at a position proximate to an axial end of the coil 17b, which is retracted inwardly from a magnetic pole face of the electromagnet 17, the permanent magnet 20 may be arranged at a position axially intermediate of the coil 17a as shown in FIG. 5A.

Figure 6:
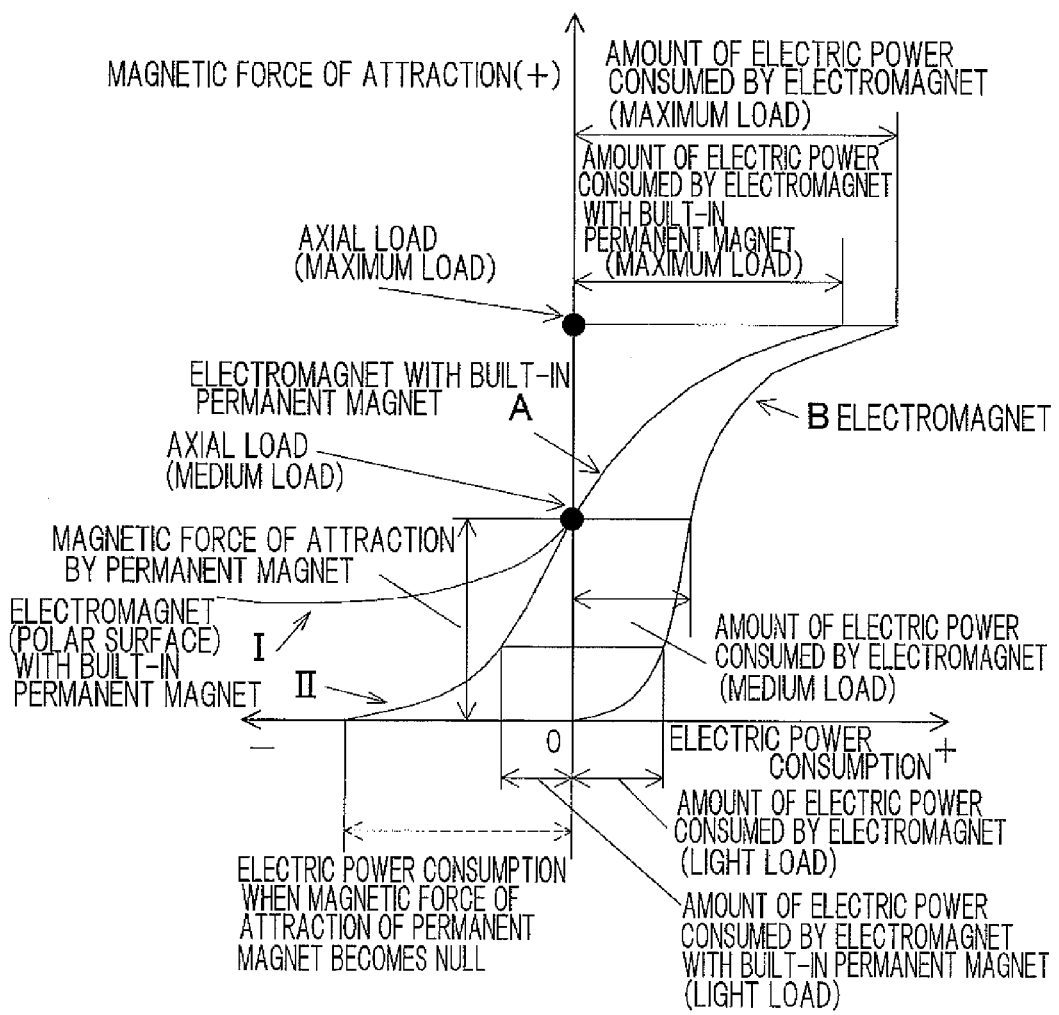
FIG. 6 is a chart showing the relation between the electric power consumption and the magnetic force of attraction, that is exhibited by the electromagnet having a permanent magnet incorporated therein, and an electromagnet having no permanent magnet incorporated therein.

FIG. 6 illustrates a chart showing the characteristic of the magnetic force of attraction relative to the electric power consumption, which is exhibited by the electromagnet 17 having the permanent magnet 20 built therein, and the electromagnet 17 having no permanent magnet 20 built therein. As the chart makes it clear, with the electromagnet 17 (indicated by A in the chart) having the permanent magnet 20 built therein, since the magnetic force of attraction exerted by the permanent magnet 20 acts, the amount of the electric power consumed when the maximum load acts can be reduced as compared with that exhibited by the unitary electromagnet 17 (indicated by B in the chart). Also, in the chart A, a portion indicated by I represents the characteristic exhibited when the permanent magnet 20 is arranged on the magnetic pole surface of the electromagnet 17, whereas a portion indicated by II represents the characteristic exhibited when the permanent magnet 20 is arranged within the yoke 17a. Thus, it is clear that with the structure, in which the permanent magnet 20 is arranged on the magnetic pole surface, the leakage magnetic fluxes from the permanent magnet 20 are large and it is difficult to render the magnetic force of attraction exerted by the permanent magnet 20 to be null within the magnetic field of the electromagnet coil 17b, whereas with the structure in which the permanent magnet 20 is arranged within the electromagnet yoke 17a in accordance with this embodiment, the leakage magnetic fluxes can be reduced, making it easy to render the magnetic force of attraction to be null.

It is to be noted that the race of change of the magnetic force of attraction relative to the electric power consumption exhibited by the electromagnet 17 (in the chart A) having the permanent magnet built therein is small as compared with the unitary electromagnet 17 (in the chart B) and this has resulted from the leakage of the magnetic fluxes at a portion provided with the permanent magnet 20.

It is to be noted that in the structure, in which the electromagnet 17 has the permanent magnet 20 built therein, if the electromagnet yoke 17a having the permanent magnet 20 arranged therein is formed with, for example, a positioning collar, the magnetic force of attraction will be reduced as a result of magnetic flux leakage at the collar and, accordingly, the yoke 17a has a sectional configuration which is preferably flat so that the yoke 17a and the permanent magnet 20 can achieve a surface contact with each other. In addition, in order to reduce influences brought about by the leakage of the magnetic fluxes, a portion of the yoke 17a, which achieves the surface contact with the permanent magnet 20, is preferably so shaped as to represent a projecting shape. Although the permanent magnet 20 is preferably of a type magnetized in the axial direction, the permanent magnet 20 of a type magnetized in the radial direction can be employed if the position of the permanent magnet 20 is altered.

As discussed above, when one of the electromagnets is employed in the form having the permanent magnet 20 built therein, it is possible to satisfy the relation in magnitude expressed by the formula (2), which has been described in connection with the first embodiment, even under the condition, in which the bearing preload is so low as to suit in the region of high speed revolutions. As a result thereof, in the control region, it is possible to avoid the phase of the mechanical system from being retarded 180° and, accordingly, even when the maximum load acts, the target to be controlled by the controller 19 can be stabilized and controller 19 can have a circuit configured simply by utilizing proportional control or proportional-integral control as shown in FIG. 2 in connection with the first embodiment.

As hereinbefore described, in the magnetic bearing device according to the third embodiment, which is applied to the turbine unit 5, since the relation in magnitude of the stiffness between the composite spring and the electromagnet springs is so chosen as to satisfy the formula (2), which has been described in connection with the first embodiment, and the permanent magnet 20 is arranged within the yoke 17a of the electromagnet 17 for the purpose of increasing the electromagnet gap, the target to be controlled by the controller 19 can have a stabilized construction, even when the maximum load acts, and the controller 19 can have a circuit configured simply by utilizing proportional control or proportional-integral control.

Figure 7:
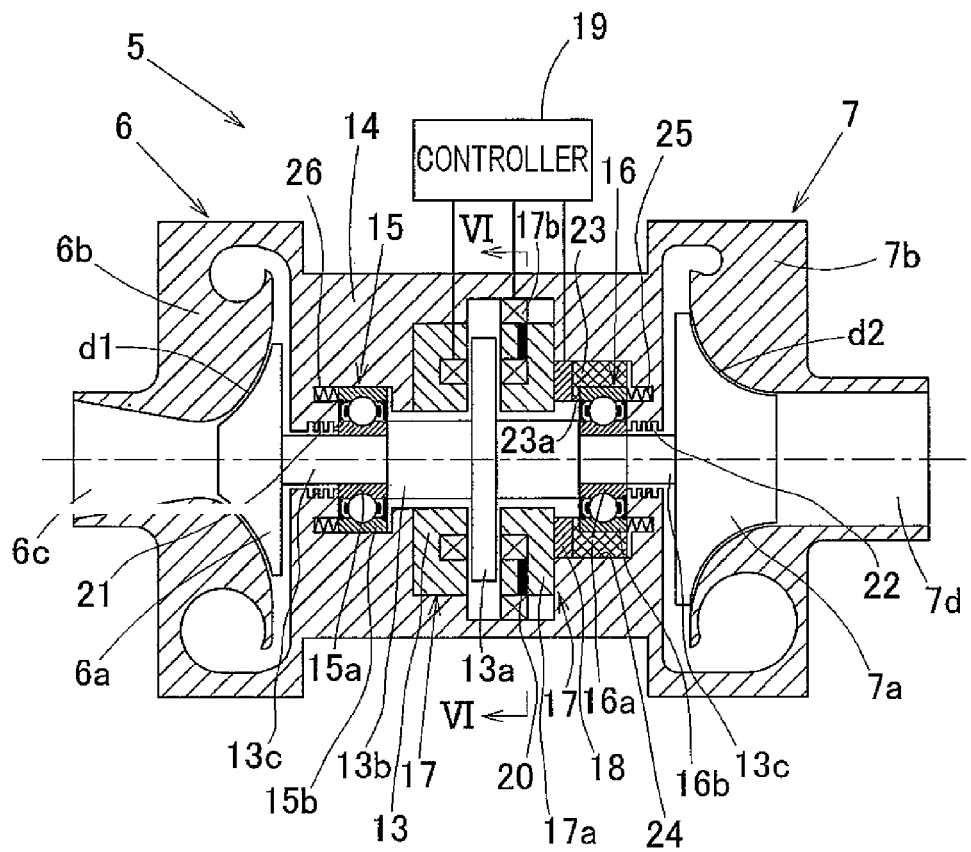
FIG. 7 is a sectional view of the turbine unit incorporating therein the magnetic bearing device according to a fourth preferred embodiment of the present invention.
Figure 8:
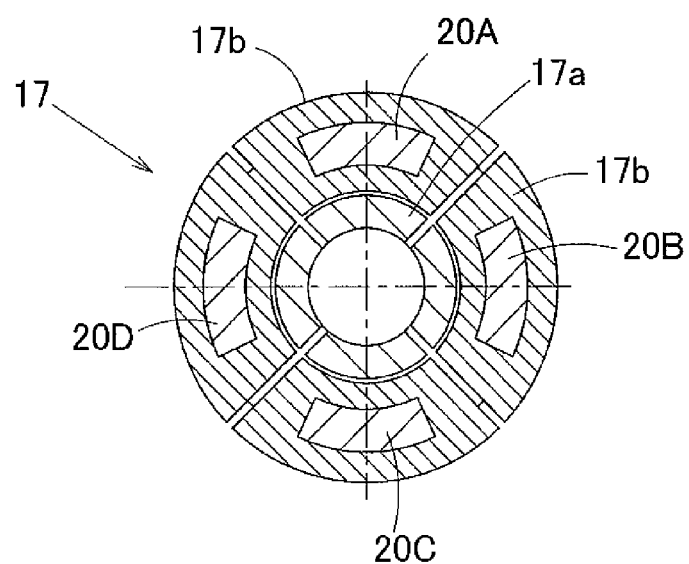
FIG. 8 is a cross-sectional view taken along the line VI-VI in FIG. 7.

FIGS. 7 and 8 illustrate a fourth preferred embodiment of the present invention. This fourth embodiment is such that in the magnetic bearing device shown in FIG. 4, the electromagnet 17 having the permanent magnet 20 built therein is so structured and so configured as shown in FIG. 8. FIG. 8 illustrates a cross-sectional view taken along the line VI-VI in FIG. 7, and the permanent magnet 20 is of a ring shape made up of a plurality of (for example, four in the illustrated embodiment) circumferentially divided segments. The permanent magnet 20 is so designed that the divided segments 20A to 20D of the permanent magnet 20 wound with individual coils 17b, respectively, are surrounded by the coils 17b. Other structural features than those described above are similar to those employed in the third embodiment shown in and described with reference to FIG. 3.

Where the electromagnet 17 having the permanent magnet 20 built therein is so structured and so configured as described above, the magnetic fields generated from the coils 17b can be added directly to the permanent magnet 20 and, therefore, leakage of the magnetic fluxes from the permanent magnet 20 can be reduced to efficiently attenuate the magnetic force of attraction exerted by the permanent magnet 20. Also, since the permanent magnet 20 is of a divided structure, handling thereof can be facilitated.

It is, however, to be noted that this construction makes it difficult to achieve the efficient utilization of a space in arranging the permanent magnet 20 and the coils 17b therein. By way of example, in such case, if an attempt is made to allow the electromagnet 17 to generate the same magnetic force of attraction as that exerted by the electromagnet 17 of the structure, in which the integral ring-shaped permanent magnet 20 is accommodated within the yoke 17a such as in the third embodiment shown in and described with reference to FIG. 4, the permanent magnet 20 will be required to have an increased thickness and, for this reason, the leakage of the magnetic fluxes will increase, resulting in an increase of the electric power consumed by the coils 17b for attenuating the magnetic force of attraction of the permanent magnet 20.

Figure 9:
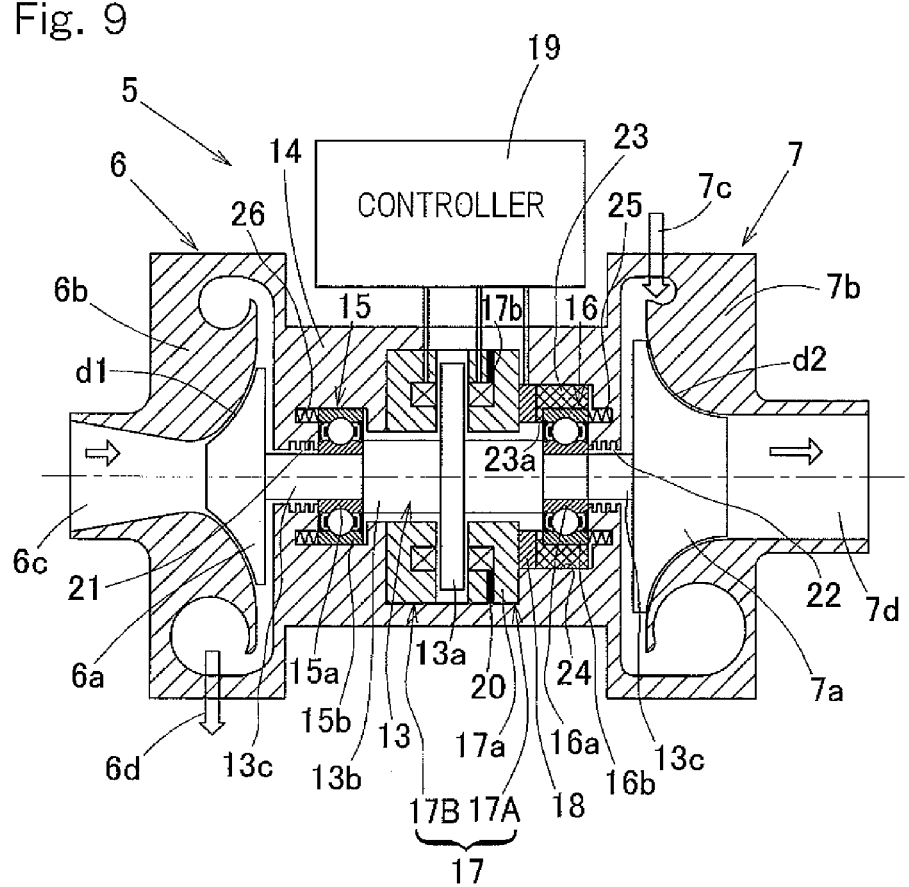
FIG. 9 is a sectional view of the turbine unit incorporating therein the magnetic bearing device according to a fifth preferred embodiment of the present invention.

A fifth preferred embodiment of the present invention will now be described with particular reference to FIGS. 9 to 12 together with FIG. 2 employed in describing the first embodiment of the present invention. FIG. 9 illustrates a sectional view of the turbine unit 5 incorporating therein the magnetic bearing device according to this fifth embodiment. In this embodiment, component parts shown in and described in connection with the fifth embodiment, which are similar to those shown in and described in connection with the first and third embodiments, are designated by like reference numerals employed in describing the first and third embodiments and, therefore, the details thereof are not reiterated for the sake of brevity.

The turbine unit incorporating the magnetic bearing device according to this fifth embodiment has the same structure as that according to the third embodiment, but differs therefrom in that, as will be described in detail later, the electromagnet is selectively used. It is to be noted that in this embodiment, the electromagnet 17 will be denoted separately, as shown in FIG. 9, as an electromagnet 17A having a permanent magnet built therein and as a unitary electromagnet 17B having no permanent magnet built therein.

In the magnetic bearing device according to the fifth embodiment in order to maintain the relation in magnitude expressed by the formula (2) in connection with the previously described first embodiment, of the electromagnets 17A and 17B cooperating with each other to sandwich the thrust plate 13a therebetween, the electromagnet (for example, the electromagnet 17A arranged proximate to the sensors 18) which supports the excessive axial load includes the yoke 17a, in which the permanent magnet 20 is arranged, to increase the electromagnet gap thereof. In FIG. 9, in order to reduce the leakage of the magnetic fluxes emanating from the permanent magnet 20, the permanent magnet 20 of a ring shape coaxial with the main shaft 13 is arranged within a yoke 17a on an outer diametric side of the coil 17b of the electromagnet 17A. But as shown in a sectional view in FIG. 8 used to describe the fourth embodiment, the permanent magnet 20 may be of a ring shape made up of a plurality of circumferentially divided segments.

As described in connection with the fourth embodiment with particular reference to FIG. 6, if the electromagnet 17A for supporting the excessive axial load is employed in the form as having the permanent magnet 20 built therein to increase the electromagnet gap, it is possible to maintain the relation in magnitude expressed by the formula (2), which has been described in connection with the first embodiment, even under the bearing preload condition of a light load that suits in the region of high speed revolutions. As a result thereof, in the control region, it is possible to avoid the phase of the mechanical system from being retarded 180° and, accordingly, even when the maximum load acts, the target to be controlled by the controller 19 can be stabilized and controller 19 can have a circuit configured simply by utilizing proportional control or proportional-integral control.

Figure 10:
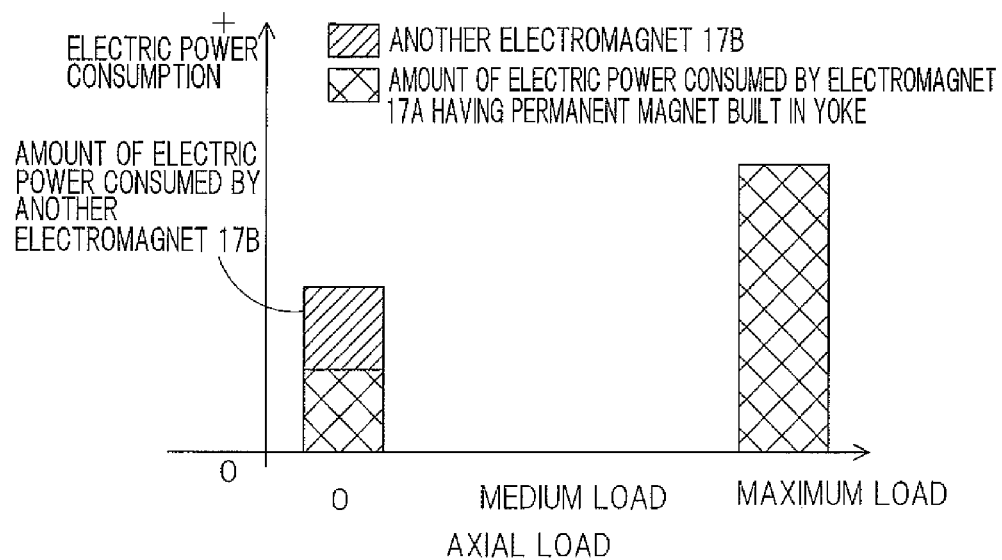
FIG. 10 illustrates a bar chart showing the amount of the electric power consumed by the electromagnets when the axial load is a light load, a medium load and a maximum load, and which is applicable where the electromagnets in the magnetic bearing device are concurrently utilized.
Figure 11:
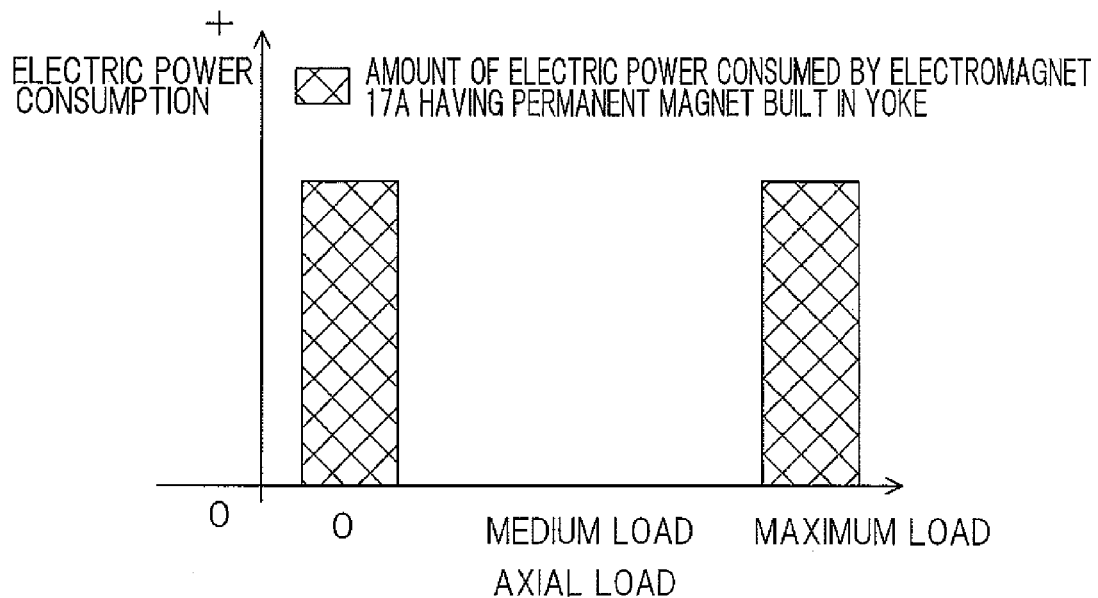
FIG. 11 illustrates a bar chart showing the amount of the electric power consumed by the electromagnets when the axial load is a light load, a medium load and a maximum load, and which is applicable to electromagnets each having a permanent magnet built therein.
Figure 12:
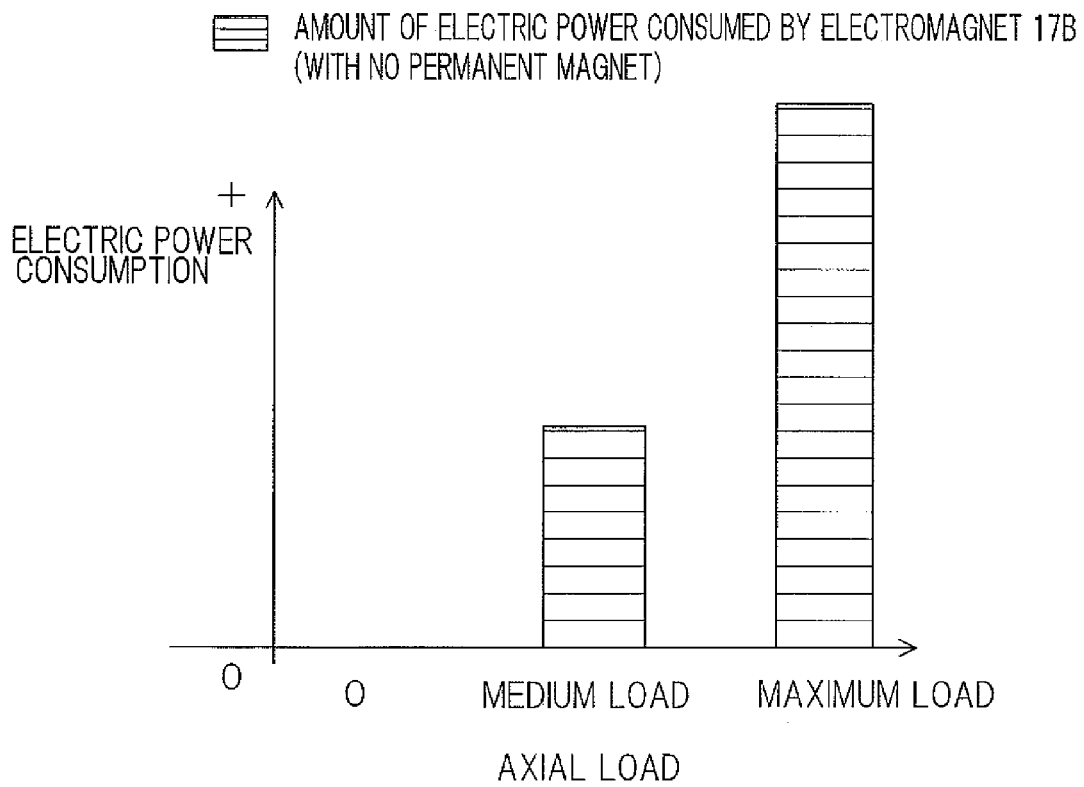
FIG. 12 illustrates a bar chart showing the amount of the electric power consumed by the electromagnets when the axial load is a light load, a medium load and a maximum load, which is applicable to electromagnets each having no permanent magnet built therein.

FIG. 10 illustrates a bar chart showing the amount of the electric power consumed by the electromagnets when the axial load is a light load, a medium load and a maximum load, and which is applicable where the electromagnets 17A and 17B are concurrently utilized. Also, FIG. 11 illustrates a bar chart showing the amount of the electric power consumed by the electromagnets when the axial load is a light load, a medium load and a maximum load, and which is applicable where electromagnets sandwiching the thrust plate 13a therebetween are employed each in the form of the electromagnet 17A including the permanent magnet 20 built therein. FIG. 12 illustrates a bar chart showing the amount of the electric power consumed by the electromagnets when the axial load is a light load, a medium load and a maximum load, which is applicable where electromagnets sandwiching the thrust plate 13a therebetween are employed each in the form of the unitary electromagnet 17B having no permanent magnet 20 built therein.

As clearly shown in FIG. 11, where the two electromagnets are employed each in the form of the electromagnet 17A having the permanent magnet 20 built therein, the magnetic force of attraction emanating from the permanent magnet 20 arranged within the electromagnet yoke 17a acts and, therefore, as compared with the use of the unitary electromagnet 17B having no permanent magnet 20 built therein for each of the two electromagnets such as shown in FIG. 6, the coil current at the time the maximum axial load is applied can be reduced, accompanied by an increase of a load capacity relative to the electric power source. However, in the example shown in FIG. 11, at the light load region of the axial load, it is necessary to apply an electric current to the electromagnet coil so that a control force of the magnetic bearing device can be lowered, and if the magnetic force of attraction emanating from the permanent magnet 20 is rendered to be completely null, the amount of the electric power consumed by the electromagnet coil will increase, accompanied by a considerable heat evolution.

In view of the above, in the magnetic bearing device, arrangement has been made that the electromagnet 17A having the permanent magnet 20 built therein and the unitary electromagnet 17B having no permanent magnet 20 built therein cooperate with each other to sandwich the thrust plate 13a therebetween and that the electromagnets 17A and 17B are concurrently utilized at the light load region of the axial load. In such case, the electromagnet 17b having no permanent magnet 20 built therein is free from the magnetic flux leakage at around the permanent magnet 20 and, therefore, the rate of change of the magnetic force of attraction relative to the electric power consumed can be increased (See FIG. 6 explained in connection with the fourth embodiment.) and, hence, as shown in FIG. 10, the electric power consumed by the electromagnets 17A and 17B as a whole can be reduced. It is to be noted that at the load region of the axial load other than the light load region, only the electromagnets 17A each having the permanent magnet 20 built therein are utilized. Selection of the electromagnets 17A and 17B in the manner described above is controlled by the controller 19.

As hereinabove described, in this magnetic bearing device, arrangement has been made that the electromagnet 17A having the permanent magnet 20 built therein and the unitary electromagnet 17B having no permanent magnet 20 built therein cooperate with each other to sandwich the thrust plate 13a therebetween and those electromagnets 17A and 17B are utilized concurrently at the light load region of the axial load. Accordingly, as compared with the case, in which the unitary electromagnet 17B having no permanent magnet 20 built therein is utilized for each of the electromagnets sandwiching the thrust plate 13a therebetween (See FIG. 12.), and the case in which the electromagnet 17A having the permanent magnet 20 built therein is utilized for each of the electromagnets sandwiching the thrust plate 13a therebetween (See FIG. 11.), the amount of the electric power consumed by the electromagnets 17A and 17B within an operating region in which the axial load acts can be best reduced.

The turbine unit 5 incorporating therein the magnetic bearing device according to any one of the first to fifth embodiments of the present invention is applied to, for example, the air cycle refrigerating system. In the air cycle refrigerating system, in order to enable the air, which will become a cooling medium, to accomplish a heat exchange efficiently by means of a heat exchanger (as will be described later with particular reference to FIG. 13) in the subsequent stage, the air is compressed to boost the temperature and the air cooled by the heat exchanger in the subsequent stage, is cooled by the expansion turbine 7 down to a target temperature, which is a very low temperature of, for example, −30 to −60° C., by means of adiabatic expansion before the air is discharged.

In this example, the turbine unit 5 does not require any power source and can cool efficiently with a compact structure, since the compressor rotor 6a and the turbine rotor 7a are mounted on the common main shaft 13 and the compressor rotor 6a is driven by a power generated by the compressor rotor 7a.

Also, in any one of the first to fifth embodiments of the present invention, in the turbine unit 5 so structured and so configured that the compressor rotor 6a and the turbine rotor 7a can be mounted on the main shaft 13 common to the thrust plate 13a and the compressor rotor 6a can be driven by a power generated by the compressor rotor 7a, since the magnetic bearing device of the above described structure is applied for supporting the main shaft 13, a stable high speed revolution of the main shaft 13 can be obtained while maintaining the proper clearances d1 and d2 for the rotors 6a and 7a, respectively, and an increase of the long term durability and that of the lifetime of the bearing units 15 and 16 can be obtained.

In other words, in order to secure the efficiency of compression and expansion of the turbine unit 5, it is necessary to maintain the respective clearances d1 and d2 between the rotors 6a and 7a and the housings 6b and 7b at a small value. By way of example, where this turbine unit 5 is applied to the air cycle refrigerating system, it is important to secure the efficiency. In this respect, since the main shaft 13 is supported by the rolling type bearing units 15 and 16, the axial position of the main shaft 13 can be regulated to a certain extent by the function of the rolling bearing to regulate the position in the axial direction and, accordingly, the respective clearances d1 and d2 between the rotors 6a and 7a and the housings 6b and 7b are kept at a constant value.

However, the main shaft 13 of the turbine unit 5 is subjected to a thrust force by the effect of; for example, a pressure of the air acting on each of the rotors 6a and 7a. Also, in the case of the turbine unit 5 used in an air cooling system, the main shaft 13 rotates at a very high speed of, for example, 80,000 to 100,000 revolutions per minute. For these reasons, when the thrust force of a kind discussed above acts on the rolling bearing units 15 and 16 then supporting the main shaft 13 rotatably, the long term durability of those bearing units 15 and 16 tends to be lowered.

Any one of the first to fifth embodiments of the present invention is effective in that since the thrust force of the kind discussed above is supported by the electromagnets 17 (17A and 17B), the thrust force acting on the rolling bearing units 15 and 16 for supporting the main shaft 13 can be reduced while suppressing an increase of a torque on a non-contact basis. In this case, since the provision has been made of the sensors 18 for detecting the thrust force, acting on the main shaft 13 by means of the air within the compressor 6 and the expansion turbine 7, and the controller 19 for controlling the supporting force exhibited by the electromagnets 17 (17A and 17B) in response to the outputs from the sensors 18, the rolling bearing units 15 and 16 can be used in an optimum condition in response to the thrust force in dependence on the specifications of those bearing units.

In particular, since the sensors 18 are positioned in proximity of the bearing unit 16, the thrust force acting on the bearing unit 16 in question can be measured directly and, as a result, the accuracy of such measurement is high, making it possible to control the thrust force precisely.

Figure 13:
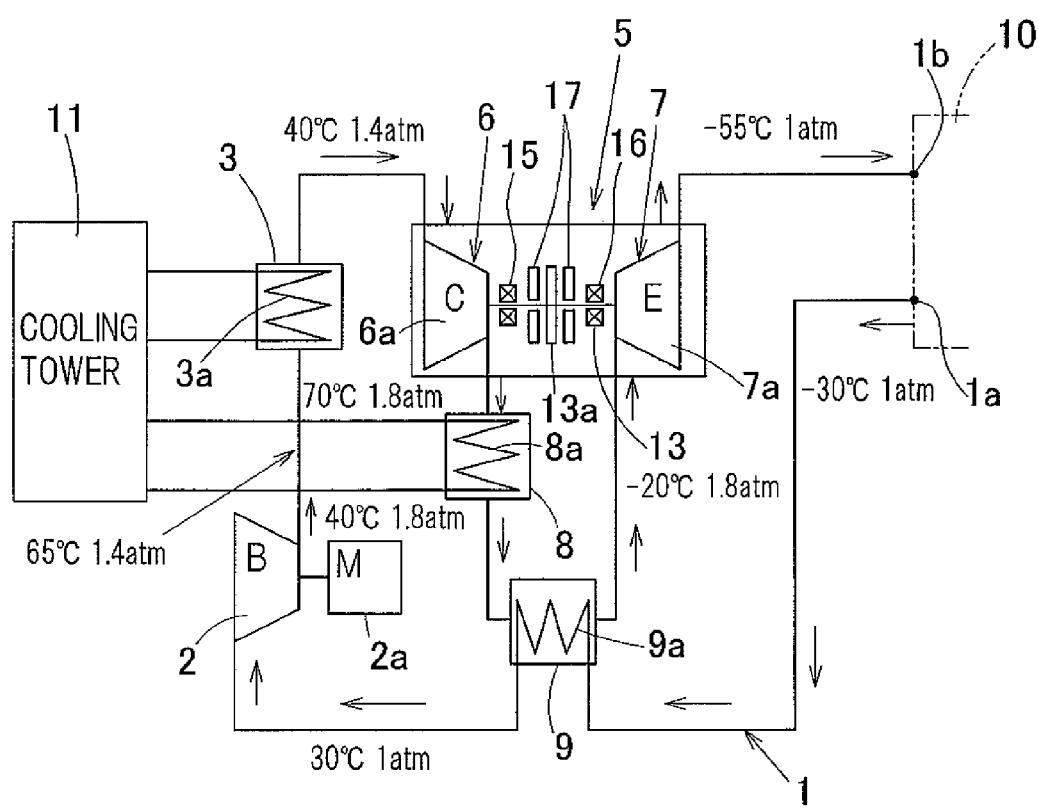
FIG. 13 is a diagram showing the air cycle refrigerating system in which the turbine unit incorporating therein the magnetic bearing device according to any one of the first to fifth embodiments of the present invention.

FIG. 13 illustrates the air cycle refrigerating system in its entirety, which makes use of the turbine unit 5 according to any one of the foregoing first to fifth embodiments of the present invention. This air cycle refrigerating system is a cooling system, in which an air within a space 10 to be cooled such as, for example, a refrigerator, is used directly as a coolant medium, and includes an air circulating circuit 1 extending from an air intake port 1a, open in the to-be-cooled space 10, back to a discharge port 1b also open in the to-be-cooled space 10. This air circulating circuit 1 includes a pre-compressing unit 2, a first heat exchanger 3, the compressor 6 of the air cycle refrigerating turbine unit 5, a second heat exchanger 8, an intermediate heat exchanger 9 and the expansion turbine 7 of the turbine unit 5, which are arranged in this order between the air intake port 1a and the air discharge port 1b. The intermediate heat exchanger 9 is operable to perform a heat exchange within the same air circulating circuit 1 between the incoming air in the vicinity of the air intake port 1a and the air, which has been boosted in temperature at the subsequent stage and is then cooled, and the air in the vicinity of the air intake port 1a flows through the heat exchanger 9a.

The pre-compressing unit 2 is in the form of, for example, a blower and is driven by a motor 2a. The first heat exchanger 3 and the second heat exchanger 8 includes respective heat exchangers 3a and 8a for circulating the coolant medium and perform a heat exchange between water within the heart exchangers 3a and 8a and the air within the air circulating circuit 1. Each of the heat exchangers 3a and 8a is fluid connected with a cooling tower 11 and the coolant medium of a temperature boosted as a result of the heat exchange can be cooled within this cooling tower 11.

This air cycle refrigerating system is a system for maintaining the to-be-cooled space 10 at a temperature of about 0 to −60° C. and the air of about 0 to −60° C. and of 1 atmospheric pressure flows from the to-be-cooled space 10 to the air intake port 1a of the air circulating circuit 1. It is to be noted that specific numerals representative of the temperature and the pressure that are used in the subsequent description are only for the purpose of illustrating rough operation condition. The air entering into the air intake port 1a is used by the intermediate heat exchanger 9 to cool the air in the subsequent stage of the air circulating circuit 1 and is heated to 30° C. This heated air remains at 1 atmospheric pressure, but is compressed by the pre-compressing unit 2 to 1.4 atmospheric pressure and, as a result of this compression, is heated up to 70° C. The first heat exchanger 3 suffices to be of a type capable of cooling the air heated to 70° C. and is, accordingly, effective to efficiently cool the air even by means of a chilled water of an ordinary temperature and cools the air to 40° C.

The air of 40° C. and 1 atmospheric pressure so cooled as a result of the heat exchange is subsequently compressed by the compressor 6 of the turbine unit 5 to 1.8 atmospheric pressure and the air heated to about 70° C. as a result of this compression is cooled by the second heat exchanger 8 down to 40° C. The air of 40° C. is then cooled by the intermediate heat exchanger 9 down to −20° C. as a result of the heat exchange with the incoming air of −30° C. The pressure is maintained at 1.8 atmospheric pressure as discharged from the compressor 6.

The air cooled by the intermediate heat exchanger 9 down to −20° C. is adiabatically expanded by the expansion turbine 7 of the turbine unit 5 and is, after having been cooled further down to −55° C., discharged from the discharge port 1b to the to-be-cooled space 10. This air cycle refrigerating system performs such a refrigerating cycle as described above.

With this air cycle refrigerating system, since in the turbine unit 5, the stabilized high speed revolution of the main shaft 13 can be obtained with the proper rotor tip clearance d1 and d2 of the rotors 6a and 7a maintained and, also, the long-term durability of the bearing units 15 and 16 can be increased. Accordingly, the reliability of the turbine unit 5 as a whole and, hence, that of the air cycle refrigerating system as a whole can be increased. Also, since the stabilized high speed revolution, the long-term durability and the reliability of the main shaft bearing units 15 and 16 of the compressive turbine unit 5, which have hitherto been a major bottleneck to the air cycle refrigerating system, can be increased, the air cycle refrigerating system has now come to be employed practically.

Hereinafter, some constructions, which will form a preferred embodiment of the present invention and which utilize the magnetic bearing device according to any one of the previously described first to seventh construction as a fundamental, will be summarized below.

[Eighth Construction]

The magnetic bearing device according to the third construction described above, in which the yoke of the electromagnet includes a yoke portion on an inner diametric side and a yoke portion on an outer diametric side and the permanent magnet is arranged in the yoke portion on the inner diametric side or the yoke portion on the outer diametric side.

In the case of this eighth construction, the magnetic flux leakage from the permanent can be reduced and the magnetic force of attraction exerted by the permanent magnet can be attenuated efficiently.

[Ninth Construction]

The magnetic bearing device according to the third or eighth construction described above, in which the yoke portion, which is held in surface contact with the permanent magnet arranged within the yoke of the electromagnet, is flat in shape.

Even in the case of this ninth construction, the magnetic flux leakage from the permanent can be reduced and the magnetic force of attraction exerted by the permanent magnet can be attenuated efficiently.

[Tenth Construction]

The magnetic bearing device according to the third, eighth or ninth construction described above, in which a portion of the yoke held in surface contact with the permanent magnet arranged within the yoke of the electromagnet is a projecting shape.

Even in the case of this tenth construction, the magnetic flux leakage from the permanent can be reduced and the magnetic force of attraction exerted by the permanent magnet can be attenuated efficiently.

[Eleventh Construction]

The magnetic bearing device according to any one of the third and eighth to tenth constructions described above, the permanent magnet is of an integral ring shape or of a circumferentially divided ring shape.

In other words, when the permanent magnet is of an integral ring shape, the space can be efficiently utilized to accommodate the permanent magnet and the electromagnet coil. When the permanent magnet is of a circumferentially divided ring shape, handling thereof can be facilitated.

What is claimed is:

1. A magnetic bearing device which comprises:
   a main shaft;
   a flange shaped thrust plate coaxially mounted on the main shaft so as to extend perpendicular to the main shaft and made of a ferromagnetic material;
   a rolling bearing unit for supporting a radial load and a magnetic bearing unit for supporting one or both of an axial load and a bearing preload;
   an electromagnet fitted to a spindle housing so as to confront the thrust plate, on a non-contact basis;
   a sensor for detecting an axial force acting on the main shaft;
   a controller for controlling the electromagnet in response to an output from the sensor; and
   a permanent magnet arranged within a yoke of the electromagnet on one side of the thrust plate,
   wherein a stiffness of a composite spring formed by the rolling bearing unit and a support system for the rolling bearing unit is higher than a negative stiffness of the electromagnet,
   wherein another electromagnet including no permanent magnet is arranged within the yoke on the other side of the thrust plate so as to confront the electromagnet on the one side, and wherein in a light load region of the axial load, both of the electromagnets concurrently operate.

2. The magnetic bearing device as claimed in claim 1, further comprising an electromagnet gap which satisfies the following formula:

$$d > k \times F\max/Kbrg,$$

wherein Kbrg represents the stiffness of the composite spring formed by the rolling bearing unit and the support system for the rolling bearing unit, Fmax represents a maximum load, d represents an electromagnet gap and k represents a proportional constant.

3. The magnetic bearing device as claimed in claim 1, wherein the electromagnet having the permanent magnet, is arranged on one side for supporting an excessive axial load and the electromagnet including no permanent magnet is arranged so as to confront the electromagnet having the permanent magnet, while sandwiching the thrust plate therebetween.

4. The magnetic bearing device as claimed in claim 1, which is applied to support the main shaft in a compressive expansion turbine system which comprises a compressor rotor and a turbine rotor both mounted on a common main shaft having the thrust plate, the compressor rotor being driven by a power generated by the turbine rotor.

5. The magnetic bearing device as claimed in claim 4, wherein the compressive expansion turbine system, to which the magnetic bearing device is applied, is applied to an air cycle refrigerating system in which an intake air is subjected sequentially to compression by means of a pre-compressing unit, cooling by means of a heat exchanger, compression by means of a compressor including the compressor rotor in a turbine unit, cooling by means of another heat exchanger, and adiabatic expansion by means of an expansion turbine including the turbine rotor in the turbine unit.

* * * * *